No. 818,236. PATENTED APR. 17, 1906.
C. D. EHRET.
SPACE SIGNALING SYSTEM.
APPLICATION FILED JULY 27, 1903.
2 SHEETS—SHEET 1.
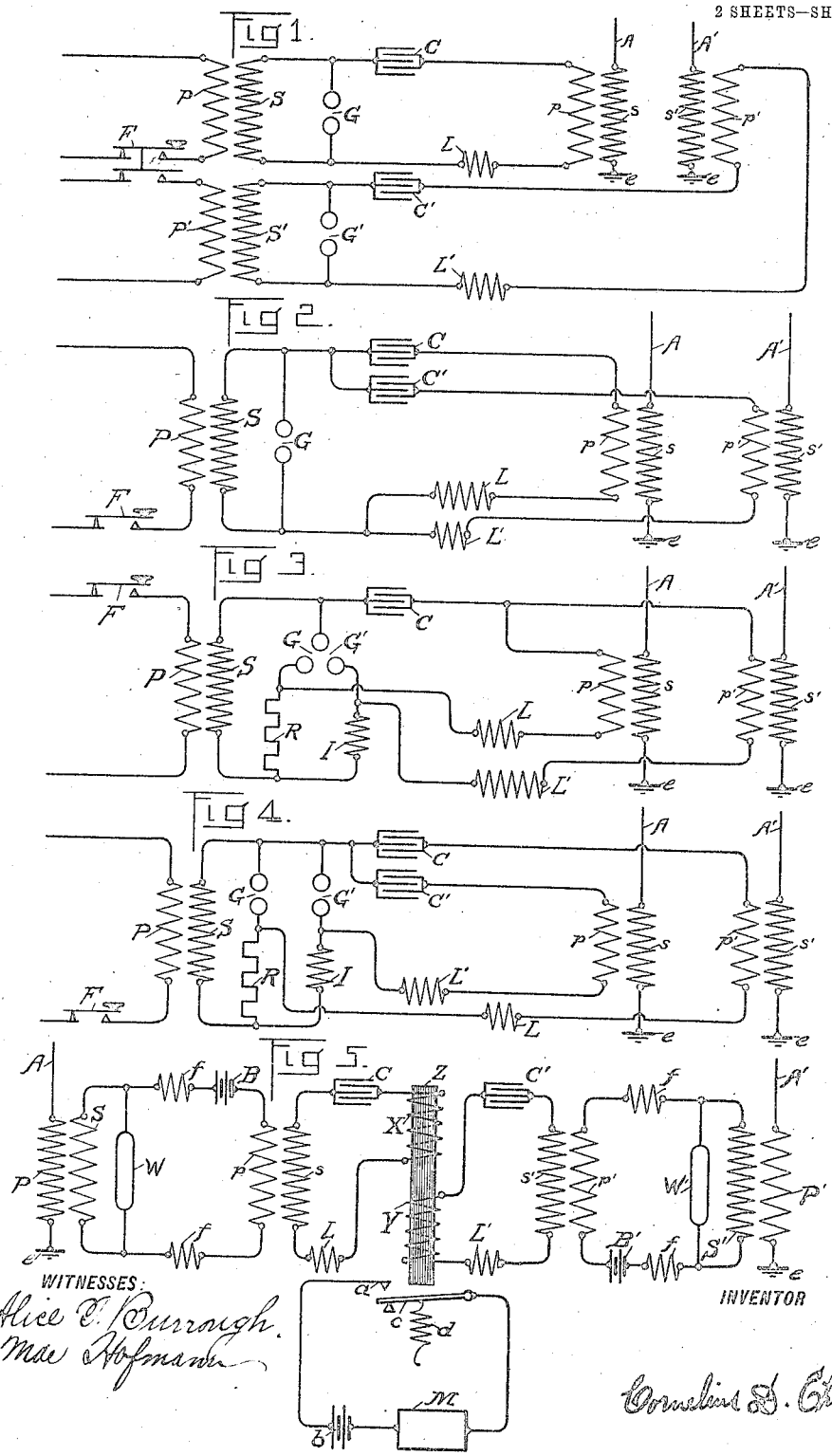
WITNESSES
Alice E. Burrough
Mae Hofmann
INVENTOR
Cornelius D. Ehret No. 818,236. PATENTED APR. 17, 1906.
C. D. EHRET.
SPACE SIGNALING SYSTEM.
APPLICATION FILED JULY 27, 1903.
2 SHEETS—SHEET 2
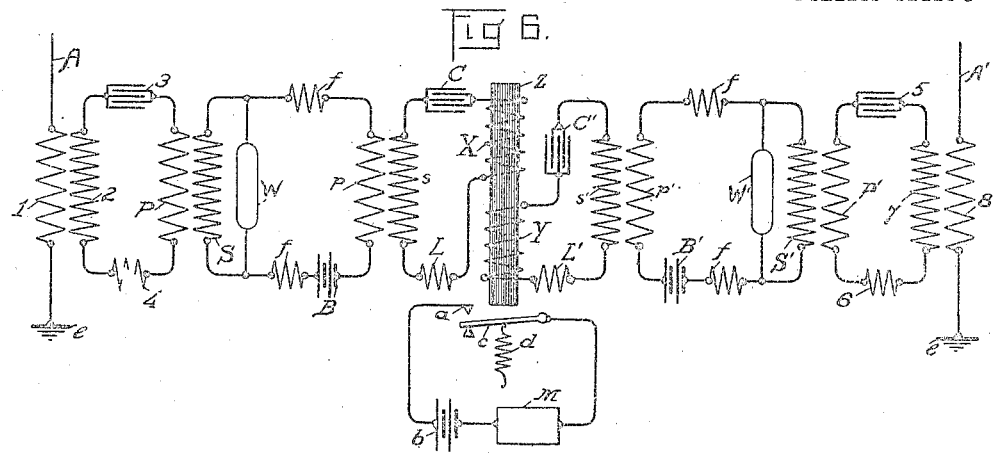
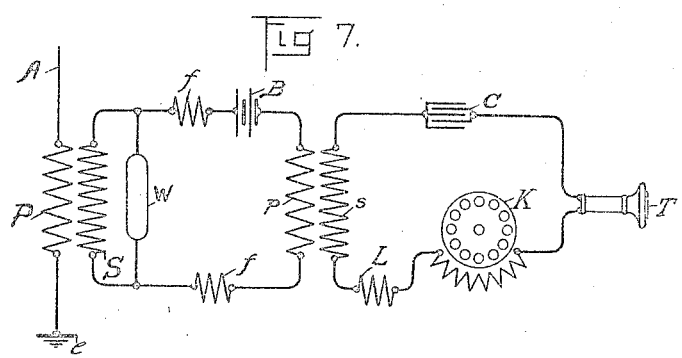
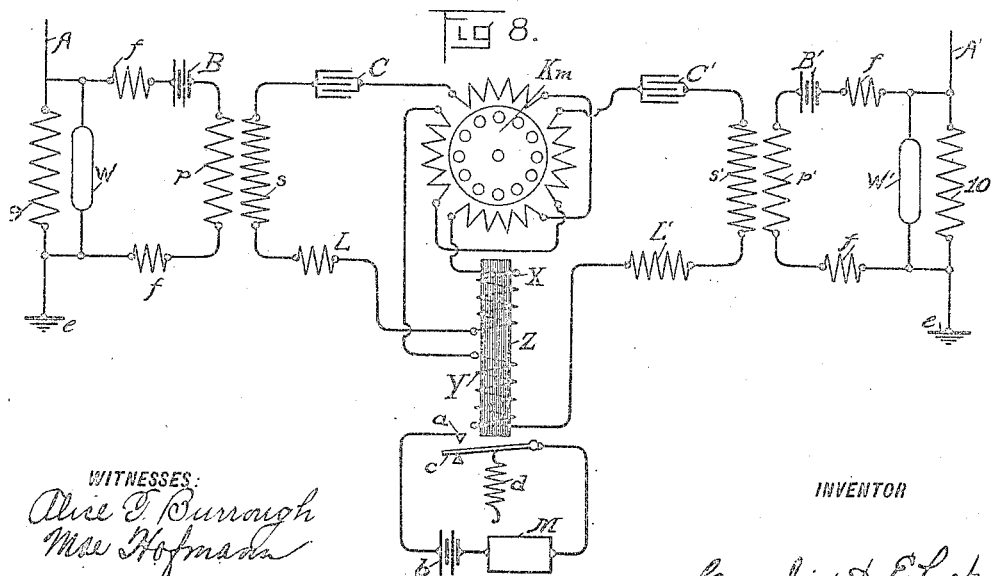
WITNESSES:
Alice T. Burrough
Mae Hofman
INVENTOR
Cornelius D. Ehret

UNITED STATES PATENT OFFICE.

CORNELIUS D. EHRET, OF ARDMORE, PENNSYLVANIA.

SPACE SIGNALING SYSTEM.

No. 818,286. Specification of Letters Patent. Patented April 17, 1906.

Application filed July 27, 1903. Serial No. 167,129.

*To all whom it may concern:*

Be it known that I, CORNELIUS D. EHRET, a citizen of the United States, residing at Ardmore, in the county of Montgomery and State of Pennsylvania, have invented new and useful Improvements in Space Signaling Systems, of which the following is a specification.

My invention relates to electrical signaling, more especially that system in which electroradiant energy, representing the signal or message, is transmitted through the natural media.

My invention resides in apparatus for generating electroradiant energy and impressing it upon the natural media, in such manner that a plurality of separate trains of waves of electromagnetic energy are simultaneously transmitted, such wave trains being dephased or displaced as to time with respect to each other.

My invention resides in apparatus for generating and impressing upon the natural media a plurality of independent wave trains forming separate series, the wave trains of each series being displaced in time with regard to the wave trains of any other series.

My invention consists of generating and impressing upon the natural media a plurality of separate series of wave trains, the wave trains of each series being displaced in time with respect to the wave trains of any other series, and the electromagnetic waves forming the trains of any one series having a periodicity or frequency characteristic of that series, and differing from the periodicity or frequency of the electromagnetic waves forming the trains of any other series.

My invention resides in apparatus for transforming the electroradiant energy of the separate series of wave trains, above mentioned, into the energy of electric currents, such electric currents causing or controlling the production of fluctuating or alternating currents or groups of impulses having the same phase displacement or similar phase displacement, as exists between the wave trains of the different series as impressed upon the natural media at the transmitter.

My invention resides in apparatus for transforming electroradiant energy into the energy of electric currents, such electric currents causing or controlling the production of an electric current of the fluctuating or alternating type, and having a frequency corresponding to the frequency of the transmitted wave trains, and boosting or reinforcing the alternating current so produced to more effectively control or actuate a receiver or other translating device.

Reference is to be had to the accompanying drawings in which

Figure 1 is a diagrammatic view of the circuits of a transmitting apparatus for impressing upon the natural media two series of wave trains, the trains of each series being displaced in time with respect to each other, and the frequency or periodicity of the electromagnetic waves forming the trains at one series being different from the periodicity or frequency of the electromagnetic waves forming the trains of the other series. Fig. 2 a diagrammatic view of modified circuit arrangements of the transmitting apparatus for producing results similar to that produced by arrangement shown in Fig. 1. Fig. 3 is a diagrammatic view of the circuits of a modified form of transmitter. Fig. 4 is a diagrammatic view of the circuit arrangements of a modified form of transmitter. Fig. 5 is a diagrammatic view of the circuits at a receiving-station wherein the energy received from any of the aforementioned transmitters is caused to produce or control dephased electric currents which coöperate to record a signal. Fig. 6 is a modified arrangement of circuits at a receiving-station, similar to Fig. 5, having modified means for selecting electroradiant energy. Fig. 7 is a diagrammatic view of the circuit arrangements at a receiving-station wherein the received electroradiant energy causes or controls the production of fluctuating or alternating current, such alternating or fluctuating current being reinforced or boosted. Fig. 8 is a diagrammatic view of receiving-circuits in which dephased wave trains cause or control the production of polyphase fluctuating or alternating currents, such polyphase currents being reinforced or boosted.

Referring to Fig. 1 P and P' are primary coils of two separate transformers, such primary windings being included in the circuit of a source of two-phased currents. That is, the current passing through the winding P is dephased ninety degrees with respect to the current passing through the winding P'. The key F is a compound one so arranged as to simultaneously open or close the circuits of the primaries P and P'. S is the secondary winding of the transformer whose primary is P and S' is the secondary of the transformer whose primary is P'. Both of these transformers are preferably step-up transformers, the voltages of the secondaries being preferably equal. G is a spark-gap in shunt to the secondary S and this spark-gap, along with the condenser C, transformer $p$ and inductance L, forms an oscillating circuit of very short period or very high frequency, as well understood in this art. A is an aerial or radiating conductor between which and the earth plate $e$ is connected the transformer secondary $s$ of the transformer whose primary is $p$. G' is a spark-gap in shunt to the secondary S', and forms, along with condenser C', transformer primary $p'$ and inductance L' an oscillating circuit of very high frequency. A' is a second aerial conductor between which and the earth-plate $e$ is the transformer secondary $s'$ coöperating with the primary $p'$. The frequency of the oscillations in the circuit C, $p$, L and G, depends, among other things, as is well understood, upon the product of the capacity and inductance of such circuit; similarly the frequency of the oscillating circuit C', $p'$, L' and G', depends upon the product of the capacity and inductance of such circuit. The capacity and inductance, or rather their product, of the circuit C, $p$, L, G is taken different from that of the circuit C' $p'$, L' and G' so that the frequency of the electromagnetic waves radiated from the conductor A is different from the frequency of the electromagnetic waves radiated from the conductor A'. Since the current supplied by the secondaries S and S' are in quadrature the oscillations for each train of waves generated in the circuit C, $p$, L, G begin at a time earlier (or later) than the commencement of a wave train generated by the circuit C', $p'$, L', G', such difference in time amounting to a quarter of a period of the current supplied to the transformer primaries P and P'. In other words the wave trains emanating from the conductor A are dephased with respect to the wave trains emanating from the conductor A', and, further, the frequency of electromagnetic waves radiated from A is different from the frequency of the electromagnetic waves radiated from A'. Suppose the two-phased currents supplied to P, P' to have a frequency of one hundred and eighty cycles per second. Then the wave trains emanating from A will be dephased from the wave trains emanating from A' by an amount corresponding with a quarter period, or, one seven-hundred-and-twentieth of a second. Furthermore, the electromagnetic waves radiated from A may be at the rate of one million per second while those radiated from A' may be at the rate of seven hundred and fifty thousand per second. I prefer to have the condensers C and C' of very nearly the same capacity, the inductances of the two circuits being chosen differently in order to secure the different frequencies, so that both condensers will be charged to their maximum potential in equal periods of time, so that the spark at the gap G will precede (or succeed) the spark at G' by exactly a quarter of a period of the current supplied to P and P'. The spark-gaps G and G' are preferably similar in every respect so that both will break down under similar circumstances. From the foregoing description it is seen, therefore, that by depressing the operator's key F, a plurality of series of wave trains are transmitted the wave trains of the different series being dephased with respect to each other, and the electromagnetic waves of each series having a frequency different from the frequency of the electromagnetic waves of any other series.

In Fig. 2, P and S are the primary and secondary windings respectively of a step-up transformer, the primary circuit being controlled by the operator's key F. G is a spark-gap in shunt to the secondary winding S and is common to the oscillating circuit C, $p$, L, G, and the oscillating circuit C', $p'$, L' and G. The constants of these two oscillating circuits are so chosen that their natural periods are different. By means of the transformer $p$, $s$, and the transformer $p'$ and $s'$, these oscillations of different frequencies are communicated to the aerial conductors A, and A'. The secondary $s$ is connected between the aerial conductor A and the earth-plate $e$, and the secondary $s'$ is connected to the aerial conductor A' and the earth-plate $e$. By depressing the operator's key F, therefore, the aerial conductors A and A' each radiate a series of wave trains, but the frequency of the electromagnetic waves emanating from A is different from that of the waves emanating from A'.

In Fig. 3, P and S are the primary and secondary respectively of a step-up transformer whose primary circuit is controlled by an operator's key F. In shunt to the secondary S are the two spark-gaps G and G' having one terminal in common. From one terminal of the secondary S there is direct communication with the common spark-gap terminal. From the other terminal of the secondary S communication is made with spark-gap G to the non-inductive resistance R and to the remaning terminal of the spark-gap G by the inductive resistance I. This arrangement gives in effect a split-phase operation, that is, the current through R is in phase with the electromotive force of the secondary S while the current through I lags behind such electromotive force. The spark-gap G forms with the condenser C primary $p$ and inductance L an oscillating circuit of definite natural period. Spark-gap G forms with the condenser C primary $p'$ and inductance L' another oscillating circuit of a different natural period. The oscillatory energy passing over spark-gap G is transformed to electroradiant energy and emitted from the aerial conductor A between which and the earth-plate e is a secondary winding s of a transformer whose primary is p. Similarly, the oscillatory energy passing over spark-gap G' is transformed and impressed upon the natural media as electroradiant energy through the agency of the transformer p', s', s' being the secondary winding connected between the aerial conductor A' and the earth-plate e. The wave trains emitted by A are, however, dephased from the wave trains emitted by A', due to the dephasing effect of the arrangement of the non-inductive resistance R and the inductive resistance I. The spark-gaps G and G' are similar so that they will break down under similar circumstances. The condenser C is common to the two oscillating circuits previously traced.

Fig. 4, is similar to Fig. 3 except that the the spark-gaps G, and G' have no common sparking terminal, and that in place of using one condenser common to the two oscillating circuits, one of the oscillating circuits has the condenser C while the other has the condenser C'. Here again the spark-gaps are made similar; and the condensers C and C' are taken with equal capacities, preferably, and the difference in frequency of the oscillations of the two oscillating circuits is caused by using different values of inductance, or inductance and resistance.

By depressing the operator's key F, Fig. 3 and Fig. 4, a plurality of series of wave trains are emitted, the trains of each series being dephased with respect to the wave trains of any other series, and the electromagnetic waves of one series have a frequency different from the frequency of the electromagnetic waves of any other series.

Referring to Fig. 5, A and A' are receiving aerial conductors of a signal-receiving system. Between the aerial conductor A and the earth-plate e is connected the primary P of a transformer whose secondary is S. Across the terminals of this secondary is connected a wave-responsive device, preferably of the self-restoring type and shown at W. Controlled by this wave-responsive device is a local circuit including the choke-coils f, f, battery B and a primary winding p of a transformer. The secondary of this transformer is shown at s and in series with this secondary winding is a condenser C, winding X and inductance L. The aerial circuit A, P, e, is attuned to the frequency of the electromagnetic waves emitted by the aerial conductor A at the transmitters shown in Fig. 1, Fig. 3, Fig. 4. In consequence, only those wave trains of electoradiant energy will influence the wave-responsive device W, that are transmitted from the aerial conductors A shown in Fig. 1, Fig. 3 or Fig. 4. The wave trains radiated by the conductors A' of the aforementioned transmitters will not influence the wave-responsive device W because the electromagnetic waves constituting such wave trains are excluded by the receiving-circuit A, P, e because such receiving-circuit is not attuned to them or selective of them. Similarly, only those wave trains emitted by the aerial conductors A' of Fig. 1, Fig. 3, or Fig. 4, will influence the wave-responsive device W', through the agency of the aerial conductor A', between which and the earth-plate e is connected the primary P' of a transformer across whose secondary S' is connected the wave-responsive device W'; because the aerial receiving-circuit A', P', e, is attuned to or selective of only those electromagnetic waves which are emitted by aerial conductors A' of the aforementioned transmitters, Fig. 1, Fig. 3, or Fig. 4. The wave-responsive device W' controls the local circuit including the choke-coils f, f, battery B', and primary winding p'. The secondary of this transformer is s' connected in series with the condenser C' L' and the windings Y. The circuit of the winding X is attuned by means of the condenser C and inductance L to a current whose frequency is equal to the frequency or rate of succession of the wave trains emitted by the transmitters shown in Fig. 1 Fig. 2, Fig. 3, or Fig. 4. The circuit of the winding Y is selective of a current of the same frequency, rendered so by the condenser C', and inductance L'. The wave-responsive devices W and W', being of the self-restoring type, permit or cause an impulse of current through the primary windings p, and p' respectively, for each wave train received or impinging upon the aerial conductors A and A' respectively. There exists, therefore, in the circuits of the windings X and Y an alternating current of a frequency equal to or a multiple of the frequency or rate of succession of the transmitted wave trains. These circuits being preferably selective, rendered so by employment of condensers and inductances as above described, will respond to electroradiant energy transmitted in wave trains succeeding each other at a definite rate only. But the alternating current in the circuit of X is dephased with respect to the alternating current in the circuit Y because the wave-responsive device W responds only to the wave trains emitted by the aerial conductors A of the transmitters shown in Fig. 1, Fig. 3, or Fig. 4, and wave-responsive device W' responds only to those wave trains emitted by the aerial conductors A' of the aforementioned transmitters. There are produced in the circuits of the secondaries s; s' current impulses, those in the circuit of s occurring at a time different from those in the circuit of s'. Similarly the current impulses in the circuits of windings X and Y occur at different instants but do not overlap in time, and thus serve to cause the core Z to receive a magnetizing impulse for every transmitted wave train. Since these magnetizing impulses do not overlap and since they occur at a rate greater than the rate of succession of the wave trains of any one series, the core Z is more nearly continuously magnetized and is thus enabled to exercise a more uniform control upon the armature $c$ with the result that such armature is prevented from fluttering. Upon the depression of the operator's key F, in the transmitters shown in Fig. 1, Fig. 3 or Fig. 4, the core Z will become magnetized will attract its armature $c$, in opposition to spring $d$ causing an engagement at the contact $a$ thereby closing a circuit including the battery $b$ and a recording instrument M. As soon as the operator's key F is released the armature $c$ is released and the recorder-circuit opened.

Referring to Fig. 6 the arrangement is identical with Fig. 5 except that an intermediate circuit is found between the aerial conductors A and A' and their respective wave-responsive devices W and W'. The transformer whose primary is shown at 1 and whose secondary is shown at 2 supplies the rapidly-oscillating currents to the secondary circuit including the condenser 3, inductance 4 and primary P. The condenser 3 and inductance 4 attune this circuit to a frequency corresponding with the frequency of the electromagnetic waves emitted by the aerial conductors A of the transmitter shown in Fig. 1, Fig. 3 or Fig. 4. The aerial circuit A, 1, $e$ may also be attuned to the same frequency. The aerial conductor A', 8 $e$, may or may not be attuned to the frequency of the electromagnetic waves emitted by the aerial conductors A' of the same transmitters. The intermediate circuit 5, 7, 6 P' is attuned to the frequency of the electromagnetic waves emitted from the aerial conductors A' of the above-mentioned transmitters. The effect obtained by the arrangement of Fig. 6 is identical with that obtained by arrangement shown in Fig. 5.

Referring to Fig. 7 A is an aerial conductor by which is received electroradiant energy. P is the primary winding of a transformer, and is connected between A and the earth-plate $e$. Across the secondary S is connected the self-restoring wave-responsive device W, which controls the local circuit including the choke-coils $f$, $f$, battery B, and primary winding $p$ of a transformer. By this arrangement, for every wave train impinging upon A, a current impulse passes through the primary $p$. In the circuit of the secondary $s$ there is then an alternating current whose frequency depends upon the rate of succession of the wave trains transmitted. To make such secondary circuit selective of wave trains succeeding each other at a certain rate only, the condenser C and the inductance L are employed to so attune such circuit. T represents a telephone-receiver, recording instrument, or any other translating device. In cases where the alternating current in the circuit of the secondary $s$ is extremely faint, due to excessive distance between the transmitting and receiving stations or for any other cause, it is reinforced by the induction-generator K. This induction-generator comprises a primary winding included in series in the circuit of $s$. The rotor consists of a cylinder or disk of magnetizable metal, properly laminated, and carrying short-circuited conductors, as well understood in the electrical art. By rotating the rotor at a rate in excess of synchronism for the frequency of the current passing through its primary, such current is reinforced or boosted. By the arrangement shown in Fig. 7, therefore, the efficiency of a wireless-telegraph receiving system is increased, and with a given amount of energy employed or radiated at the transmitting-station a greater effect may be produced in the recording instrument of the receiver, or any other translating device.

In Fig. 8 the circuit arrangements are in general those shown in Fig. 5 except that the wave-responsive devices W and W' are connected directly in shunt with inductances 9 and 10 respectively. Such inductances in conjunction with the aerial conductors A and A' form resonant receiving-circuits. As in the case of Fig. 5, the currents in the circuits of the secondaries $s$, and $s'$ are of a frequency corresponding with the rate of succession of the transmitted wave trains, such currents being, however, dephased, in quadrature, due to the dephasing of the wave trains at the transmitters shown in Fig. 1, Fig. 3 or Fig. 4. In these circuits, are included the primary windings of the two-phase induction-generator K$m$ which accordingly reinforces the currents in the circuits of the windings X and Y, surrounding the laminated core Z. The recorder M is controlled in the manner described in connection with Fig. 5. In place of using these two-phase currents, reinforced by K$m$, for magnetizing the core Z, any other suitable recording means or translating device may be supplied, controlled or actuated.

From the foregoing description it is seen that a highly-selective system of wireless signaling is produced, and that very faint effects in the receiving-circuit may be boosted or reinforced.

What I claim is—

1. In a wireless-telegraph receiver, means for producing fluctuating electric current, means for reinforcing said current, and a recorder controlled by said reinforced current.

2. In a wireless signaling system, receiving apparatus comprising means responsive to the received electroradiant energy for producing fluctuations or changes in locally-generated current, means for amplifying said changes or fluctuations in said current, and a signal-translating instrument controlled or actuated by said amplified current.

3. In a wireless signaling system, receiving apparatus comprising an aerial conductor, a wave-responsive device associated therewith, a source of locally-generated current controlled by said wave-responsive device, means for amplifying the changes or fluctuations in said current as caused by said wave-responsive device, and a signal-translating instrument actuated or controlled by said amplified current.

4. In a wireless signaling system, receiving apparatus comprising an aerial conductor, a wave-responsive device associated therewith, a local circuit containing a source of energy controlled by said wave-responsive device, a booster associated with said local circuit, and a signal-translating instrument actuated or controlled by the increased energy.

5. In a wireless signaling system, receiving apparatus comprising an aerial conductor, means associated therewith for producing a current fluctuating in a manner to represent a signal, means for increasing the amplitude of the fluctuations, and a signal-translating instrument controlled or actuated by said increased fluctuations.

6. In a wireless signaling system, transmitting apparatus comprising means for impressing upon the natural media trains of electroradiant energy waves succeeding each other at practically uniform rate, in combination with receiving apparatus comprising an aerial conductor, a self-restoring wave-responsive device associated therewith, a local source of energy controlled by said wave-responsive device, an associated induction-generator driven above synchronism for the rate of succession of current impulses depending upon the transmitted wave trains, and a signal-translating instrument controlled or actuated by the reinforced energy.

7. In a wireless signaling system, means for impressing upon the natural media a plurality of series of wave trains, the waves of each series having a characteristic frequency, and the wave trains of each series succeeding and not overlapping the wave trains of the other series, in combination with receiving apparatus comprising a plurality of receiving-circuits, each circuit being selective of the waves of a certain series, and a magnetizable mass subjected to a number of magnetizing forces equal to or a multiple of the sum of the transmitted wave trains, said magnetizing forces succeeding each other in an order corresponding with the order of succession of the transmitted wave trains, said magnetizable mass producing or controlling the production of a signal.

CORNELIUS D. EHRET.

Witnesses:
ALICE P. BURROUGH.
JNO. P. CROASDALE.